US010396881B2

(12) United States Patent
Akkarakaran et al.

(10) Patent No.: US 10,396,881 B2
(45) Date of Patent: Aug. 27, 2019

(54) RACH DESIGN FOR BEAMFORMED COMMUNICATIONS

(71) Applicant: QUALCOMM Incorporated, San Diego, CA (US)

(72) Inventors: Sony Akkarakaran, Poway, CA (US); Tao Luo, San Diego, CA (US); Muhammad Nazmul Islam, Edison, NJ (US); Bilal Sadiq, Basking Ridge, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 253 days.

(21) Appl. No.: 15/433,738

(22) Filed: Feb. 15, 2017

(65) Prior Publication Data
US 2017/0359114 A1 Dec. 14, 2017

Related U.S. Application Data

(60) Provisional application No. 62/348,797, filed on Jun. 10, 2016.

(51) Int. Cl.
*H04B 7/06* (2006.01)
*H04L 5/00* (2006.01)
(Continued)

(52) U.S. Cl.
CPC ......... *H04B 7/0697* (2013.01); *H04B 7/0695* (2013.01); *H04B 7/088* (2013.01);
(Continued)

(58) Field of Classification Search
CPC .... H04B 7/0697; H04B 7/0695; H04B 7/088; H04L 5/0048; H04L 61/6022; H04W 72/0413; H04W 74/0833; H04W 88/02
See application file for complete search history.

(56) References Cited

U.S. PATENT DOCUMENTS

| 8,634,345 B2 | 1/2014 | Yin et al. |
| 2003/0050072 A1* | 3/2003 | Noerpel ............. H04B 7/18539 |
| | | 455/452.1 |

(Continued)

FOREIGN PATENT DOCUMENTS

| EP | 2887558 A1 | 6/2015 |
| WO | 2008054119 A2 | 5/2008 |

(Continued)

OTHER PUBLICATIONS

International Search Report and Written Opinion—PCT/US2017/032469—ISA/EPO—Aug. 30, 2017.

*Primary Examiner* — Duc C Ho
(74) *Attorney, Agent, or Firm* — Arent Fox, LLP; Clint R. Morin

(57) ABSTRACT

In a mmW network, a UE and a base station may establish a link using a RACH procedure. Because mmW and other band communications may rely on accurate beamforming to overcome link attenuation, the UE may need to provide beam information feedback to the base station. In particular, the UE may receive a beam-formed message from the base station during the RACH procedure. The UE may determine beam information based on the received beam-formed message during the RACH procedure. The UE may transmit a message to the base station during the RACH procedure, and the message may include the determined beam information.

36 Claims, 9 Drawing Sheets

(51) Int. Cl.
   *H04L 29/12*     (2006.01)
   *H04W 72/04*    (2009.01)
   *H04W 74/08*    (2009.01)
   *H04B 7/08*      (2006.01)
   *H04W 88/02*    (2009.01)
   *H04B 7/00*      (2006.01)

(52) U.S. Cl.
   CPC ........ *H04L 5/0048* (2013.01); *H04L 61/6022* (2013.01); *H04W 72/0413* (2013.01); *H04W 74/0833* (2013.01); *H04B 7/00* (2013.01); *H04W 88/02* (2013.01)

(56) References Cited

U.S. PATENT DOCUMENTS

| | | | | |
|---|---|---|---|---|
| 2010/0291940 A1* | 11/2010 | Koo | ................ | H04B 7/024 455/450 |
| 2010/0296467 A1* | 11/2010 | Pelletier | ............ | H04W 74/002 370/329 |
| 2014/0010178 A1* | 1/2014 | Yu | ................... | H04W 74/0833 370/329 |
| 2015/0049824 A1* | 2/2015 | Kim | ................. | H04B 7/0456 375/267 |
| 2016/0309460 A1 | 10/2016 | Heo et al. | | |
| 2017/0164377 A1* | 6/2017 | Ho | ...................... | H04W 16/28 |
| 2017/0207843 A1* | 7/2017 | Jung | .................... | H04B 7/0408 |
| 2017/0207845 A1* | 7/2017 | Moon | .................. | H04B 7/088 |
| 2017/0302341 A1* | 10/2017 | Yu | ...................... | H04B 7/0639 |
| 2017/0325057 A1* | 11/2017 | Zhang | ................... | H04W 4/02 |
| 2017/0331670 A1* | 11/2017 | Parkvall | ........... | H04W 52/0274 |

FOREIGN PATENT DOCUMENTS

| | | | |
|---|---|---|---|
| WO | 2013024942 A1 | 2/2013 | |
| WO | 2014104758 A1 | 7/2014 | |

\* cited by examiner

RACH DESIGN FOR BEAMFORMED COMMUNICATIONS

CROSS-REFERENCE TO RELATED APPLICATION(S)

This application claims the benefit of U.S. Provisional Application Ser. No. 62/348,797, entitled "RACH DESIGN FOR MILLIMETER-WAVE COMMUNICATIONS" and filed on Jun. 10, 2016, which is expressly incorporated by reference herein in its entirety.

BACKGROUND

Field

The present disclosure relates generally to communication systems, and more particularly, to random access channel (RACH) design for beamformed communications, such as millimeter wave (mmW) communications and other communications.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to support mobile broadband access through improved spectral efficiency, lowered costs, and improved services using OFDMA on the downlink, SC-FDMA on the uplink, and multiple-input multiple-output (MIMO) antenna technology. However, as the demand for mobile broadband access continues to increase, there exists a need for further improvements in LTE technology. These improvements may also be applicable to other multi-access technologies and the telecommunication standards that employ these technologies.

In a mmW network, a user equipment and a base station may establish a link using a RACH procedure. Because mmW communications and other beamformed communications may rely on accurate beamforming to overcome link attenuation, a need exists to improve the link between the user equipment and the base station by enabling feedback of control information during the RACH procedure.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an LTE contention-based RACH procedure for uplink time synchronization, a user equipment sends a first message and listens for a second message from a base station. In response to the received second message, the user equipment sends a third message to the base station. Unlike LTE communications, mmW and other beamformed communications may rely on accurate beamforming to overcome link attenuation. As such, in a mmW network, the second message from the base station for the contention-based RACH procedure may be transmitted using beamforming. A need exists to improve the link between the user equipment and the base station by enabling feedback during the RACH procedure, such as during the transmission of the third message from the user equipment to the base station.

In an aspect of the disclosure, a method, a computer-readable medium, and an apparatus are provided. The apparatus may be a user equipment. The apparatus may receive a beam-formed message from a base station during a RACH procedure. The apparatus may determine beam information based on the received beam-formed message during the RACH procedure. The apparatus may transmit a message to the base station during the RACH procedure that includes the determined beam information.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
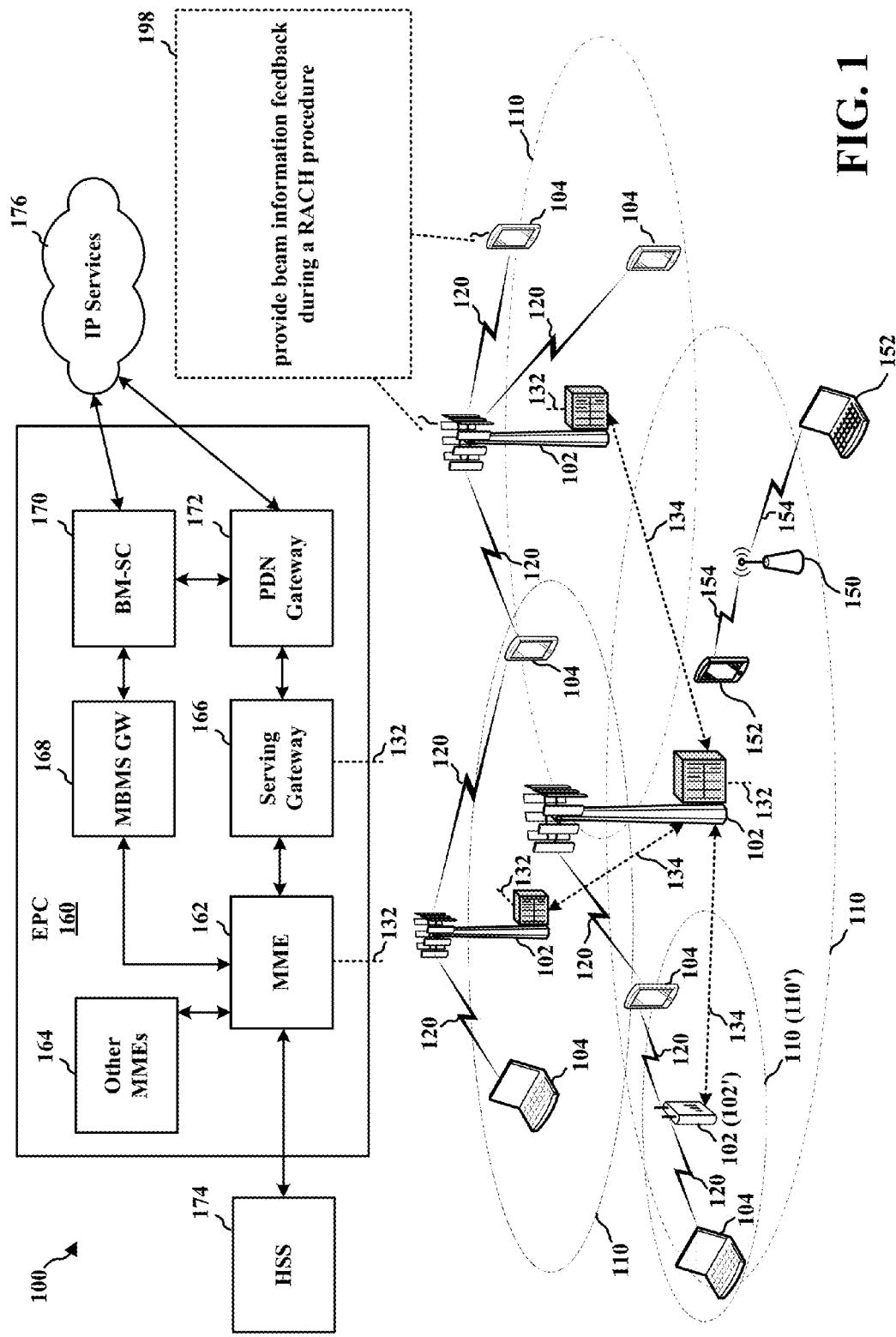
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include eNBs. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. The base stations 102/UEs 104 may use spectrum up to Y MHz (e.g., 5, 10, 15, 20 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ LTE and use the same 5 GHz unlicensed frequency spectrum as used by the Wi-Fi AP 150. The small cell 102', employing LTE in an unlicensed frequency spectrum, may boost coverage to and/or increase capacity of the access network. LTE in an unlicensed spectrum may be referred to as LTE-unlicensed (LTE-U), licensed assisted access (LAA), or MuLTEfire.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, or any other similar functioning device. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to provide beam information feedback during a RACH procedure (198).

Figure 2:
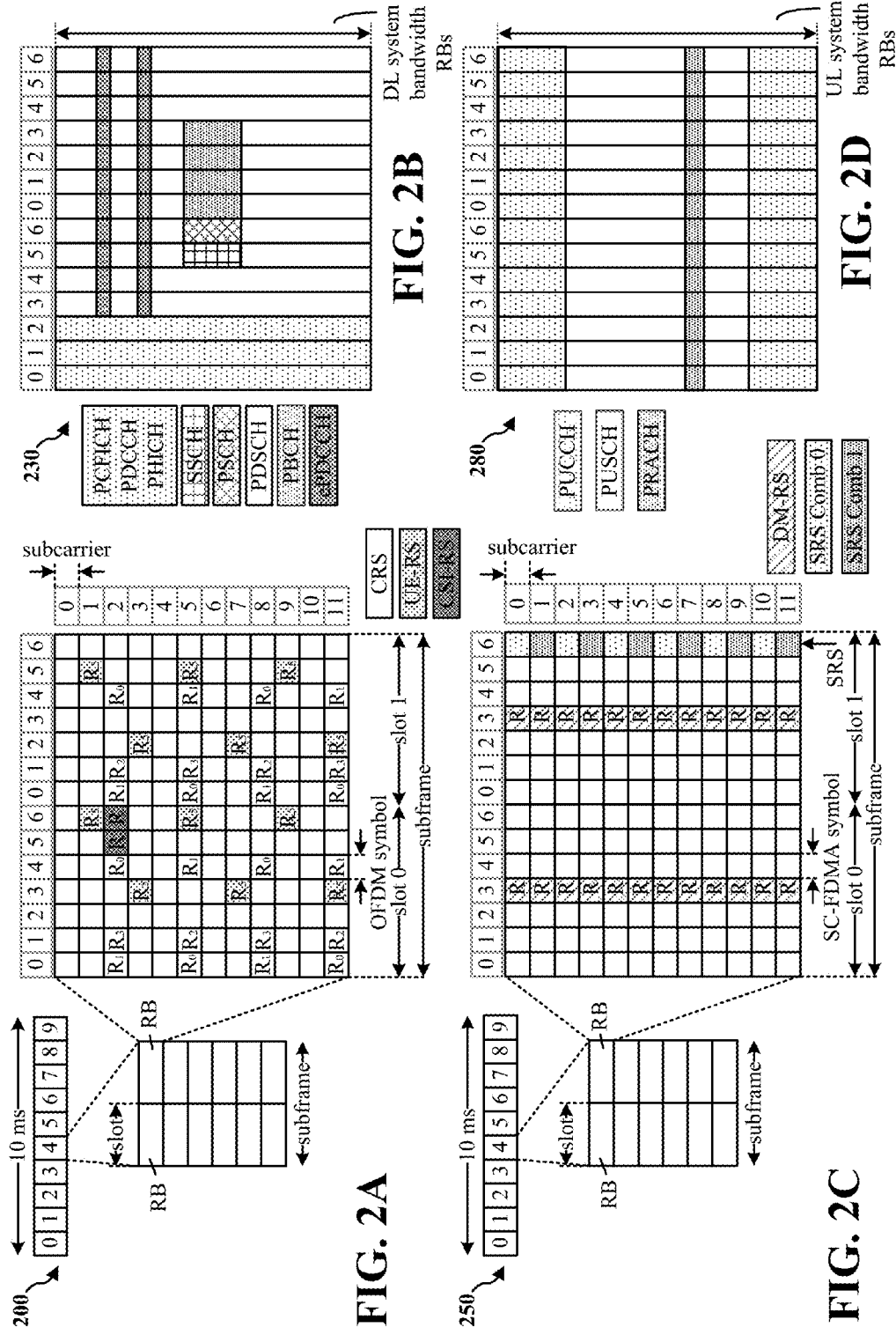
FIGS. 2A, 2B, 2C, and 2D are diagrams illustrating LTE examples of a DL frame structure, DL channels within the DL frame structure, an UL frame structure, and UL channels within the UL frame structure, respectively.

FIG. 2A is a diagram 200 illustrating an example of a DL frame structure in LTE. FIG. 2B is a diagram 230 illustrating an example of channels within the DL frame structure in LTE. FIG. 2C is a diagram 250 illustrating an example of an UL frame structure in LTE. FIG. 2D is a diagram 280 illustrating an example of channels within the UL frame structure in LTE. Other wireless communication technologies may have a different frame structure and/or different channels. In LTE, a frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). In LTE, for a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_0$, $R_2$, and $R_3$, respectively), UE-RS for antenna port 5 (indicated as $R_5$), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (HACK) feedback based on the physical uplink shared channel (PUSCH). The primary synchronization channel (PSCH) is within symbol 6 of slot 0 within subframes 0 and 5 of a frame, and carries a primary synchronization signal (PSS) that is used by a UE to determine subframe timing and a physical layer identity. The secondary synchronization channel (SSCH) is within symbol 5 of slot 0 within subframes 0 and 5 of a frame, and carries a secondary synchronization signal (SSS) that is used by a UE to determine a physical layer cell identity group number. Based on the physical layer identity and the physical layer cell identity group number, the UE can determine a physical cell identifier (PCI). Based on the PCI, the UE can determine the locations of the aforementioned DL-RS. The physical broadcast channel (PBCH) is within symbols 0, 1, 2, 3 of slot 1 of subframe 0 of a frame, and carries a master information block (MIB). The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the eNB. The UE may additionally transmit sounding reference signals (SRS) in the last symbol of a subframe. The SRS may have a comb structure, and a UE may transmit SRS on one of the combs. The SRS may be used by an eNB for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
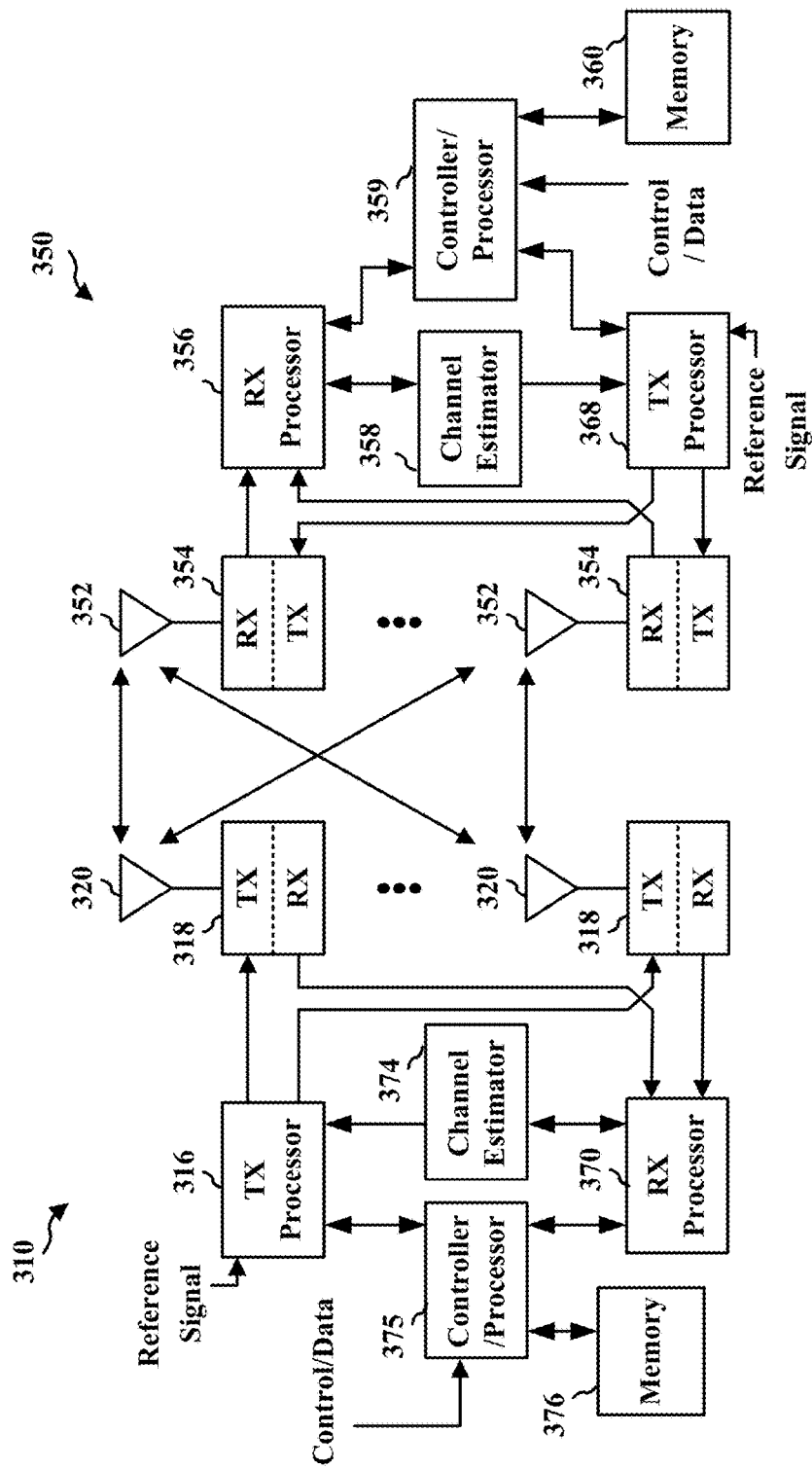
FIG. 3 is a diagram illustrating an example of an evolved Node B (eNB) and user equipment (UE) in an access network.

FIG. 3 is a block diagram of an eNB 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each sub-carrier of the OFDM signal. The symbols on each subcarrier, and the reference signal, are recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the eNB 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4:
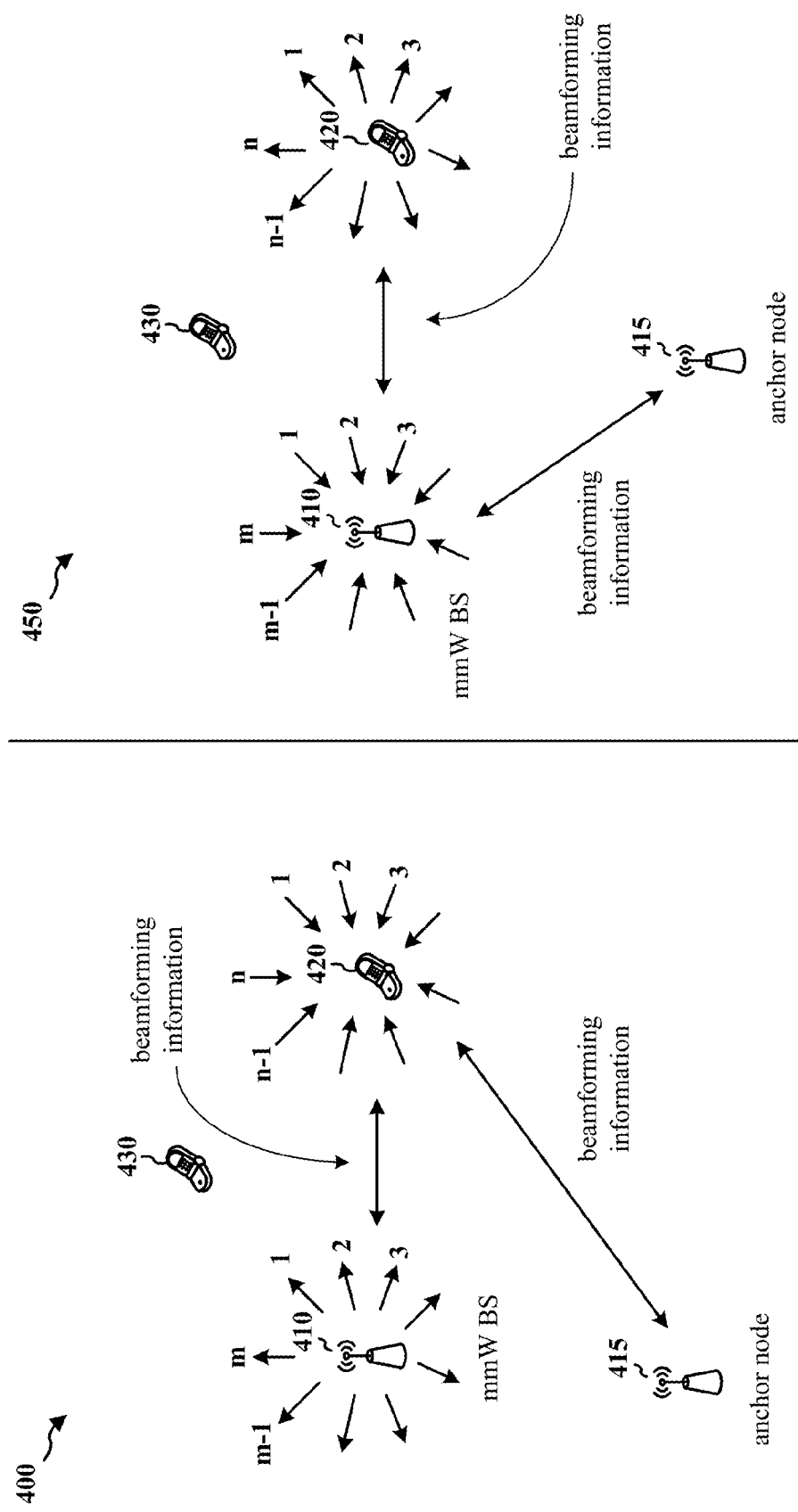
FIG. 4 illustrates diagrams of a mmW network.

FIG. 4 illustrates diagrams 400, 450 of a mmW network. In the diagram 400, for example, the mmW network includes a mmW base station 410 and a number of UEs 420, 430. The base station 410 may include hardware for performing analog and/or digital beamforming. If the base station 410 is equipped with analog beamforming, at any one time, the base station 410 may transmit or receive a signal in only one direction. If the base station 410 is equipped with digital beamforming, the base station 410 may concurrently transmit multiple signals in multiple directions or may receive multiple signals concurrently in multiple directions. Further, the UE 420, for example, may include hardware for performing analog and/or digital beamforming. If the UE 420 is equipped with analog beamforming, at any one time, the UE 420 may transmit or receive a signal in only one direction. If the UE 420 is equipped with digital beamforming, the UE 420 may concurrently transmit multiple signals in multiple directions or may concurrently receive multiple signals in multiple directions.

Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters (the super high frequency (SHF) band extends between 3 GHz and 30 GHz, also referred to as centimeter wave). While the disclosure herein refers to mmWs, it should be understood that the disclosure also applies to near mmWs. Further, while the disclosure herein refers to mmW base stations, it should be understood that the disclosure also applies to near mmW base stations.

In order to build a useful communication network in the millimeter wavelength spectrum, a beamforming technique may be used to compensate for path loss. Beamforming technique focuses the RF energy into a narrow direction to allow the RF beam to propagate farther in that direction. Using the beamforming technique, non-line of sight (NLOS) RF communication in the millimeter wavelength spectrum may rely on reflection and/or diffraction of the beams to reach the UE. If the direction becomes blocked, either because of UE movement or changes in the environment (e.g., obstacles, humidity, rain, etc.), the beam may not be able to reach the UE. Thus, in order to ensure that the UE has continuous, seamless coverage, multiple beams in as many different direction as possible may be available. In an aspect, the beamforming technique may require that the mmW base stations and the UEs transmit and receive in a direction that allows the most RF energy to be collected.

In the mmW network, UEs may perform beam sweeps with mmW base stations within range. The beam sweeps may be performed as illustrated in the diagram 400 and/or diagram 450. Referring to the diagram 400, in a beam sweep, the mmW base station 410 may transmit m beams in a plurality of different spatial directions. The UE 420 listens/scans for the beam transmissions from the mmW base station 410 in n different receive spatial directions. When listening/scanning for the beam transmissions, the UE 420 may listen/scan for the beam sweep transmission from the mmW base station 410 m times in each of the n different receive spatial directions (a total of m*n scans). In another configuration, referring to the diagram 450, in a beam sweep, the UE 420 may transmit n beams in a plurality of different spatial directions. The mmW base station 410 listens/scans for the beam transmissions from the UE 420 in m different receive spatial directions. When listening/scanning for the beam transmissions, the mmW base station 410 may listen/scan for the beam sweep transmission from the UE 420 n times in each of the m different receive spatial directions (a total of m*n scans).

Based on the performed beam sweeps, the UEs and/or the mmW base stations determine a channel quality associated with the performed beam sweeps. For example, if the beam sweep process in diagram 400 is performed, the UE 420 may determine the channel quality associated with the performed beam sweeps. However, if the beam sweep process in the diagram 450 is performed, the mmW base station 410 may determine the channel quality associated with the performed beam sweeps. If the UE 420 determines a channel quality associated with the performed beam sweeps, the UE 420 may, in on aspect, send the channel quality information (also referred to as beam sweep result information) to an anchor node 415. The anchor node 415 may be an mmW base station, an eNB, or another type of base station. The UE 420 may send the beam sweep result information directly to the anchor node 415 if the anchor node 415 is in range, or may send the beam sweep result information to a serving mmW base station (e.g., the mmW base station 410), which forwards the beam sweep result information to the anchor node 415. If the mmW base station 410 determines a channel quality associated with the performed beam sweeps, the mmW base station 410 sends the beam sweep result information to the anchor node 415. In another aspect, the UE 420 may send the beam sweet result information to the mmW base station 410. In an aspect, the channel quality may be affected by a variety of factors. The factors include movement of the UE 420 along a path or due to rotation (e.g., a user holding and rotating the UE 420), movement along a path behind obstacles or within particular environmental conditions (e.g., obstacles, rain, humidity). The UE 420, the mmW base station 410, and the anchor node 415 may also exchange other information, such as configuration information, for beamforming (e.g., analog or digital beamforming capabilities, beamforming type, timing information, etc.) Based on the received information, the anchor node 415 may provide beamforming configuration information to the mmW base station 410 and/or the UE 420 (e.g., mmW network access configuration information, information for adjusting beam sweeping periodicity, information regarding overlapping coverage for predicting a handoff to another base station, such as a mmW base station).

In an LTE network, a UE may initiate a RACH procedure for initial network access. Because the UE may not be connected to the network, the UE may not have allocated resources available to inform the network about its desire to connect. Instead, the UE may send a request over a shared medium—the RACH. Other UEs that are also not connected to the network may also wish to send a request over the RACH for initial network access. With multiple UEs transmitting over the shared resource, there is a possibility that different requests may collide. Such a random access procedure may be referred to as a contention-based RACH procedure. In another scenario, the network may indicate that the UE may use a unique identity to prevent its request from colliding with requests from other UEs. This scenario may be referred to as a contention-free RACH procedure.

In a contention-based RACH procedure, the UE may send a RACH transmission to an eNB and listen for a RACH response (RAR) message. The UE may send a message in response to the RAR message that includes a common control channel (CCCH) payload over an uplink shared channel (UL SCH) resource identified in the RAR message. In the LTE contention-based RACH procedure, however, no UCI is sent by the UE in response to the RAR message. In an aspect, UCI may include CQI, PMI, RI, ACKs, and NACKs, among other information. However, because mmW communications rely on accurate beamforming to overcome link attenuation, the reliability of the RACH procedure and the overall link may be improved if the message transmitted by the UE in response to the RAR message, which may be beam-formed to the UE, includes beam information. For example, the beam information may include an identity and/or a strength of a strongest downlink beam received at the UE from a mmW base station.

Figure 5:
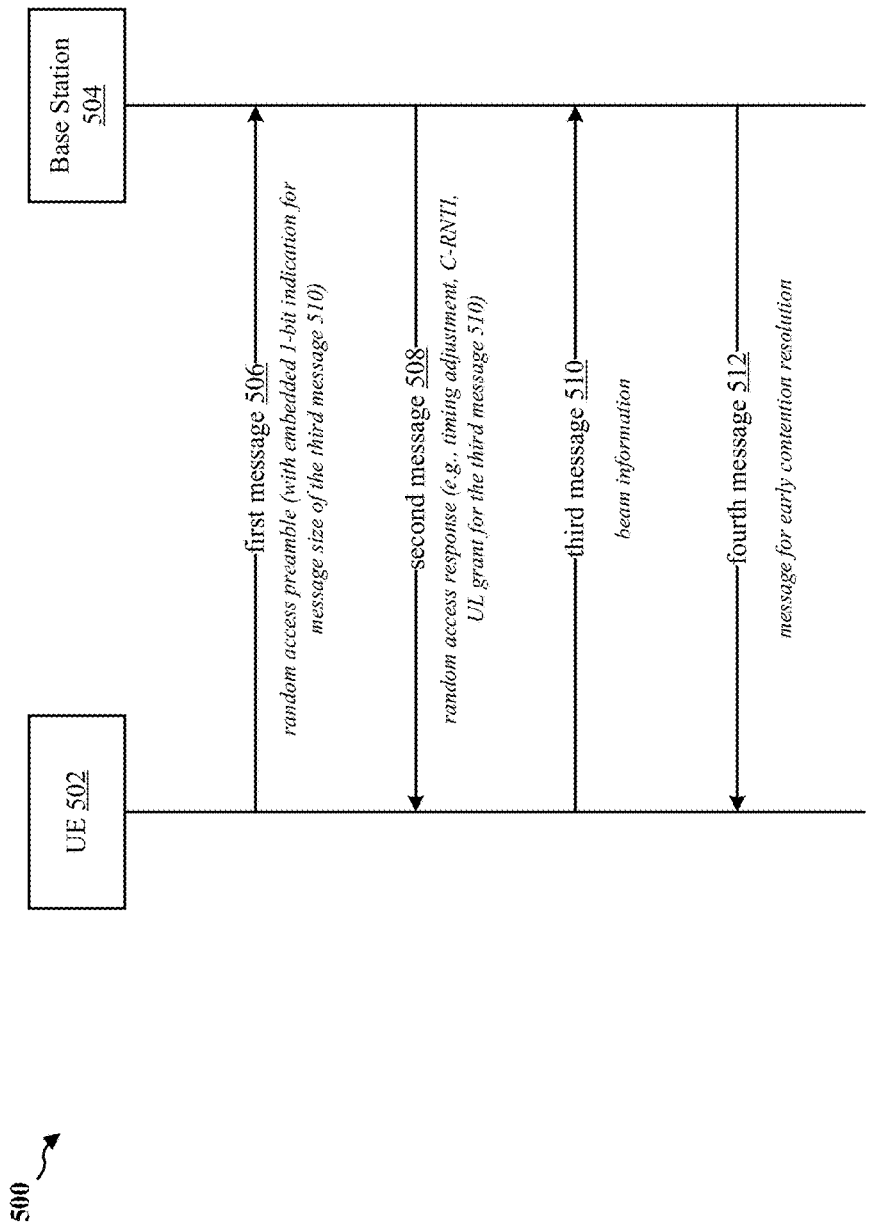
FIG. 5 is a diagram of a modified RACH procedure for mmW communications.

FIG. 5 is a diagram 500 of a modified RACH procedure for mmW communications. UEs may be scheduled for uplink transmission if its uplink transmission timing is synchronized. For unsynchronized UEs, the RACH may be used for initial network access to achieve uplink time synchronization for a UE that either has not yet acquired or has lost its uplink synchronization. In another aspect, an uplink-synchronized UE may be allowed to use RACH to send a scheduling request (SR) if the UE does not have other uplink resources allocated in which to send the SR.

Referring to FIG. 5, a UE 502 may engage in a contention-based RACH procedure with a base station 504 (e.g., a mmW base station). The RACH procedure may include a message exchange involving four messages—a first message 506, a second message 508, a third message 510, and a fourth message 512. In an aspect, the UE 502 may select an available physical RACH (PRACH) contention-based signature (or a RACH preamble). The signature may be one of 64 different patterns, and if multiple UEs have the same signature, then a collision may occur. In an aspect, a subset of the 64 signatures/preambles may be reserved for the contention-free RACH procedure. The UE 502 may select the signature based on the size of the transmission resource needed for transmitting the third message 510. The UE 502 may determine the size of the transmission resource based on a path loss and a required transmission power for the third message 510. The selected signature (or preamble) may be transmitted by the UE 502 to the base station 504 in the first message 506. In an aspect, the first message 506 may include a random access radio network temporary identity (RA-RNTI). The RA-RNTI may identify the time slot number in which the preamble is sent and may also serve as one identifier for the UE 502.

In response to receiving the first message 506, the base station 504 may transmit the second message 508 to the UE 502. The second message 508 may be a RAR message sent via the PDSCH. The second message 508 may provide the identity of the detected preamble, a timing alignment instruction that enables the UE 502 to synchronize subsequent uplink transmissions (e.g., a timing advance used to compensate for the round trip delay caused by the distance between the UE 502 and the base station 504), and an initial uplink resource grant (e.g., PUSCH or PUCCH resource grant) for the UE 502 to transmit the third message 510 (e.g., via the PUSCH). In an aspect, the second message 508 may include an assignment of a temporary Cell Radio Network Temporary Identifier (C-RNTI). In another aspect, the second message 508 may indicate the RA-RNTI included in the first message 506. In another aspect, the second message 508 may also include a backoff indicator, which the base station 504 may use to instruct the UE 502 to back off for a period of time before retrying a random access attempt.

In an aspect, the base station 504 may transmit the second message 508 to the UE 502 using the beamforming techniques, such as those discussed in FIG. 4. When the UE 502 receives the beam-formed first message 506, the UE 502 may initiate a beam information reporting procedure. The UE 502 may determine beam information associated with the second message 508. For example, the second message 508 may represent a beam information request, and the UE 502 may measure the signal strengths of the various downlink beams from the base station 504 and identify the strongest downlink beam. The UE 502 may determine one or more antenna indices at the base station 504 that are associated with the strongest downlink beam. For example, the UE 502 may identify n beams with the strongest beam reference signal received power (BRSRP) and report beam information for those n beams. The UE 502 may also determine other beamforming related information (or beam state information). In another aspect, the second message 508 may indicate a request for a number of beam information reports (e.g., 2 bits in which '00' indicates a request for 1 report, '01' indicates a request for 2 reports, '10' indicates a request for 4 reports, and '11' indicates a request for no reports).

After determining the beam information, the UE 502 may transmit the beam information as a report, such as a beam state information report, in the third message 510. The third message 510 may be a Layer 2/Layer 3 message or an RRC connection request message transmitted on the PUSCH. The beam state information report may also be transmitted in the PUCCH. The third message 510 may also include a UE identifier that identifies the UE 502 (e.g., a random value or a temporary mobile subscriber identity (TMSI)), an RRC connection request, a tracking area update, and/or a scheduling request. The third message may be addressed to the temporary C-RNTI indicated in the second message 508 or include a permanent C-RNTI if the UE 502 was previously connected to the base station 504.

After receiving the third message 510, the base station 504 may adjust one or more transmission parameters for beam forming based on the beam information contained in the third message 510. For example, the base station 504 may select one or more antennas, determine transmit power on the selected antennas, and/or choose an MCS to use for subsequent transmission to the UE 502.

The base station 504 may transmit the fourth message 512 to the UE 502. The fourth message 512 may be a contention resolution message (e.g., if multiple UEs initiated the RACH procedure using the same selected signature). In an aspect, the fourth message 512 may be transmitted using beamforming based on parameters that were adjusted according to the received beam information. The fourth message 512 may be addressed to the permanent C-RNTI or the temporary C-RNTI indicated in the third message 510. If the third message 510 includes a temporary C-RNTI, then the fourth message 512 may echo the UE identifier indicated in the third message 510. If there is a collision, only the UE identified in the fourth message 512 may transmit HARQ feedback to the base station 504. Other UEs may understand there was a collision and may not transmit any HARQ feedback to the base station 504.

Figure 6A:
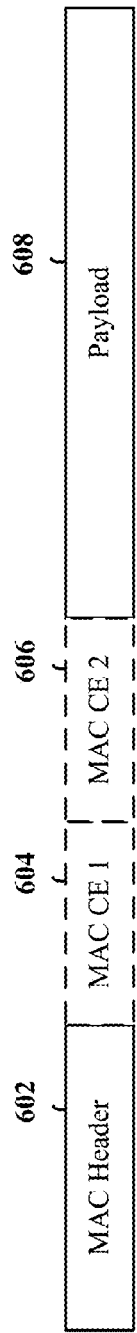
FIG. 6A is a diagram of a message transmitted during a RACH procedure.

FIG. 6A is a diagram 600 of a message (e.g., the third message 510 or an RRC connection request message) transmitted during a RACH procedure. The message may include a MAC header, one or more MAC control elements (MAC CEs) such as a first MAC CE 604 and a second MAC CE 606, and a payload 608. In an aspect, the message may correspond to the third message 510 in FIG. 5, and the beam information may be contained in various portions of the message.

In a first configuration, the beam information may be carried within the first MAC CE 604 (or any other MAC CE). For example, the first MAC CE 604 may be defined to include one or more fields dedicated for beam information (e.g., an index field, a signal strength field, etc.).

In a second configuration, the beam information may be added to the payload 608 (e.g., a CCCH payload). In LTE, the payload 608 may be echoed back by the network (e.g., the base station 504) in the fourth message 512. Echoing the beam information in the fourth message 512, however, may not provide any added benefit in contention-resolution. The base station 504 may omit the beam information from the fourth message 512 or provide other control information in the fourth message 512. In this configuration, the beam information may be represented as one or more bits. The bits may be concatenated with any existing bits to be transmitted in the payload 608 (e.g., tracking area update, TMSI, etc.). The combined bits may be encoded by mapping the combined bits onto modulation symbols (e.g., BPSK, QPSK, QAM modulation) for transmission on resource elements within one or more resource blocks such as those shown in FIG. 2A.

Figure 6B:
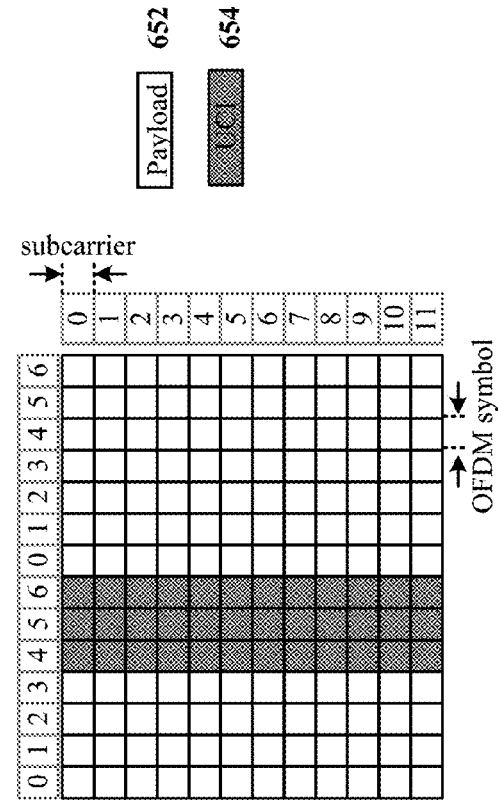
FIG. 6B is a diagram of a resource block allocated during a RACH procedure.

In a third configuration, the beam information may be carried in the message as UCI, similar to CQI reports, buffer status information (BSI) reports, and basic rate information (BRI) reports. The UCI may be multiplexed with the payload 608. Current RACH procedure does not allow for multiplexing UCI with UL-SCH payload in the third message 510. However, such signaling may be invoked for mmW communications to improve beamforming performance. In an aspect, a resource block 650 (or any other number of resource blocks), as shown in FIG. 6B, may be allocated to the UE 502 for transmitting the third message 510 based on the second message 508. The payload bits may be encoded by mapping the payload bits onto a first set of modulation symbols. The bits corresponding to the beam information may be separately encoded onto a second set of modulation symbols. To determine how many resource elements in the resource block 650 to use for transmitting the beam information versus the payload, the UE 502 may determine a beta offset value $\beta_{offset}$, which may correspond to a ratio of resource elements that may be used for transmitting the beam information versus the resource elements that may be used for transmitting the payload (or vice versa). By indicating a ratio of resource elements for reporting beam information, the beta offset value may represent a request for a beam information (or a beam state information) report. Referring to FIG. 6B, using the beta offset value, the UE 502 may determine a first set of resources 652 to use for transmitting the first set of modulation symbols corresponding to the payload 608 and a second set of resources 654 for transmitting the second set of modulation symbols corresponding to the beam information such that the payload 608 and the UCI are multiplexed together within the resource block 650. FIG. 6B displays one configuration for multiplexing UCI with the payload; in particular, one or more OFDM symbols are allocated for UCI and other OFDM symbols are allocated for payload. Other configurations may also be used. For example, within an OFDM symbol, some subcarriers or tones may be allocated for transmitting UCI while other subcarriers within the same OFDM symbol may be allocated for transmitting payload.

The UE 502 may determine the beta offset value in a number of different ways. In one aspect, the beta offset value may be a fixed, default value used by all UEs when UEs have beam information to transmit. In another aspect, the beta offset value may be a function of one or more parameters transmitted in the PBCH (e.g., a system frame number, a number of transmit antennas used by the base station 504, system bandwidth, etc.). In another aspect, the beta offset value may be received from the network or from the base station 504 within the second message 508, for example. In this aspect, the beta offset value may be optional within the second message 508. A missing beta offset value may indicate that the UE 502 is to use a default value or may indicate that the UE 502 is not to transmit any beam information.

In another aspect, in a contention-free RACH procedure, if the base station 504 orders the UE 502 (via a message transmitted in the PDCCH) to perform uplink timing synchronization, the UE 502 may already be RRC connected to the base station 504, and therefore, may already have the beta offset value. In another aspect, during a handover from a source base station to a target base station, a handover message from the UE 502 to the target base station (or vice versa) may signal the beta offset value. In another aspect, during handover, the UE 504 may use the existing beta offset value prior to handover, and the source base station may signal the beta offset value to the target base station.

Figure 7:
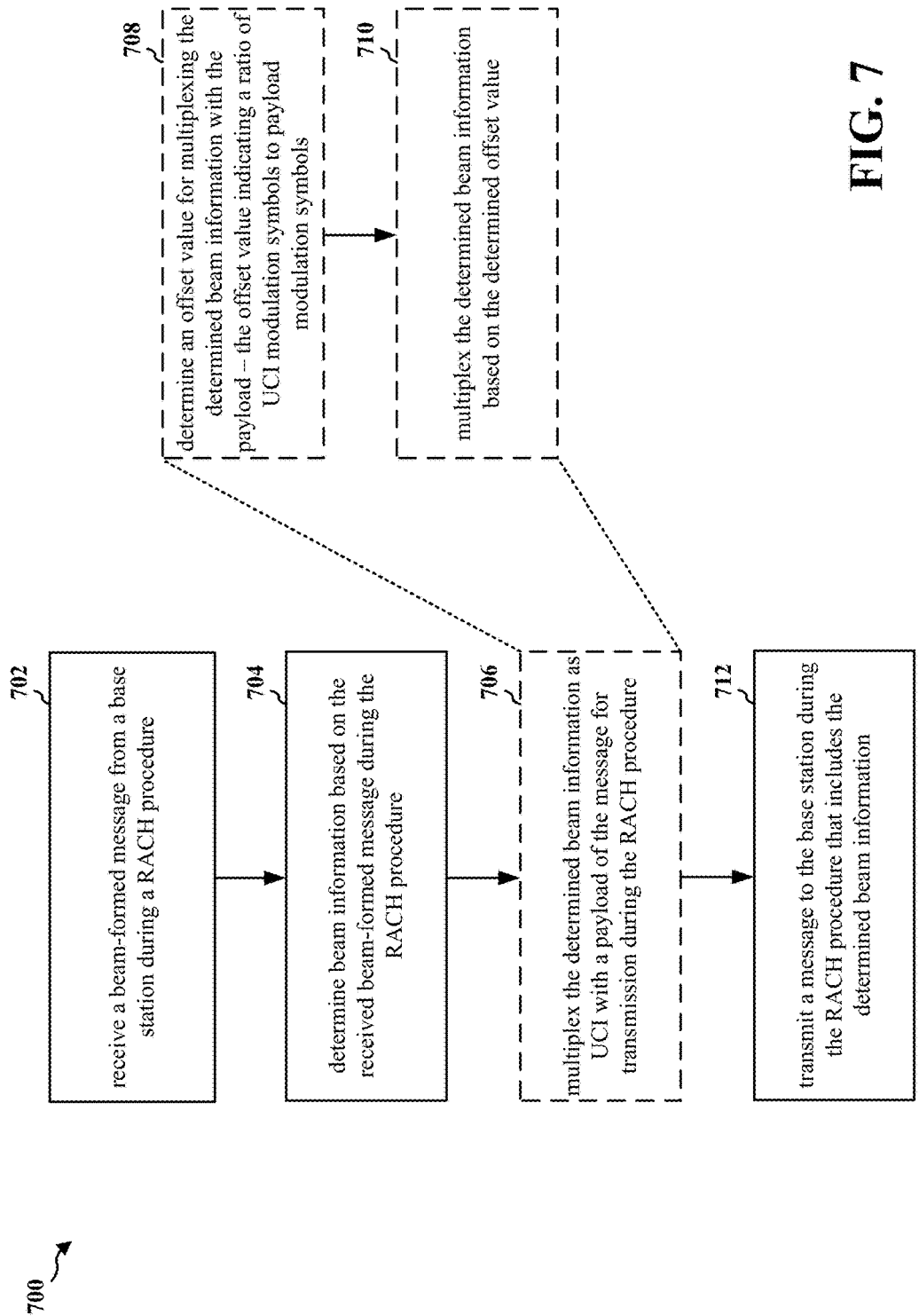
FIG. 7 is a flowchart of a method of wireless communication.

FIG. 7 is a flowchart 700 of a method of wireless communication. The method may be performed by a UE (e.g., the UE 502, the apparatus 802/802').

At 702, the UE may receive a beam-formed message from a base station during a RACH procedure. For example, referring to FIG. 5, the UE may be the UE 502, and the base station may be the base station 504. The UE 502 may receive the second message 508 (the beam-formed message) from the base station 504 during a RACH procedure. As previously noted, the second message 508 may also be a beam state information request, requesting the UE 502 to obtain beam state information.

At 704, the UE may determine beam information based on the received beam-formed message during the RACH procedure. For example, referring to FIG. 5, the UE 502 may determine beam information based on the second message 508 received from the base station 504. The UE 502 may measure the received signal strength of the various downlink beams from the base station 504. The UE 502 may identify a beam received from the base station 504 (e.g., identify the transmit antenna index) that has the strongest signal strength. The beam information may include the index identifying the strongest received beam (e.g., the index may correspond to the antenna at the base station 504) and the signal strength of the strongest received beam.

In one configuration, at 706, the UE 502 may multiplex the determined beam information as UCI with a payload for transmission during the RACH procedure. The UE 502 may multiplex the determined beam information by, at 708, determining an offset value for multiplexing the determined beam information with the payload. The offset value may indicate a ratio of UCI modulation symbols to payload modulation symbols. At 710, the UE 502 may multiplex the determined beam information based on the determined offset value. For example, referring to FIGS. 5, 6A, and 6B, the UE 502 may determine the offset value by receiving the offset value from the base station 504 in the second message 508. The UE 504 may multiplex the beam information with the payload 608 data for transmission in the third message 510 based on the beta offset value.

At 712, the UE may transmit a message to the base station during the RACH procedure that includes the determined beam information. For example, referring to FIG. 5, the UE 502 may transmit the third message 510 to the base station 504 during the RACH procedure, and the third message 510 may include the determined beam information. In one example, the beam information may be multiplexed with the payload 608 of the third message 510 as described at 706, 708, and 710. In another example, the beam information may be included in the first MAC CE 604 of the third message 510. In yet another example, the beam information may be encoded with the payload 608 of the third message 510.

Figure 8:
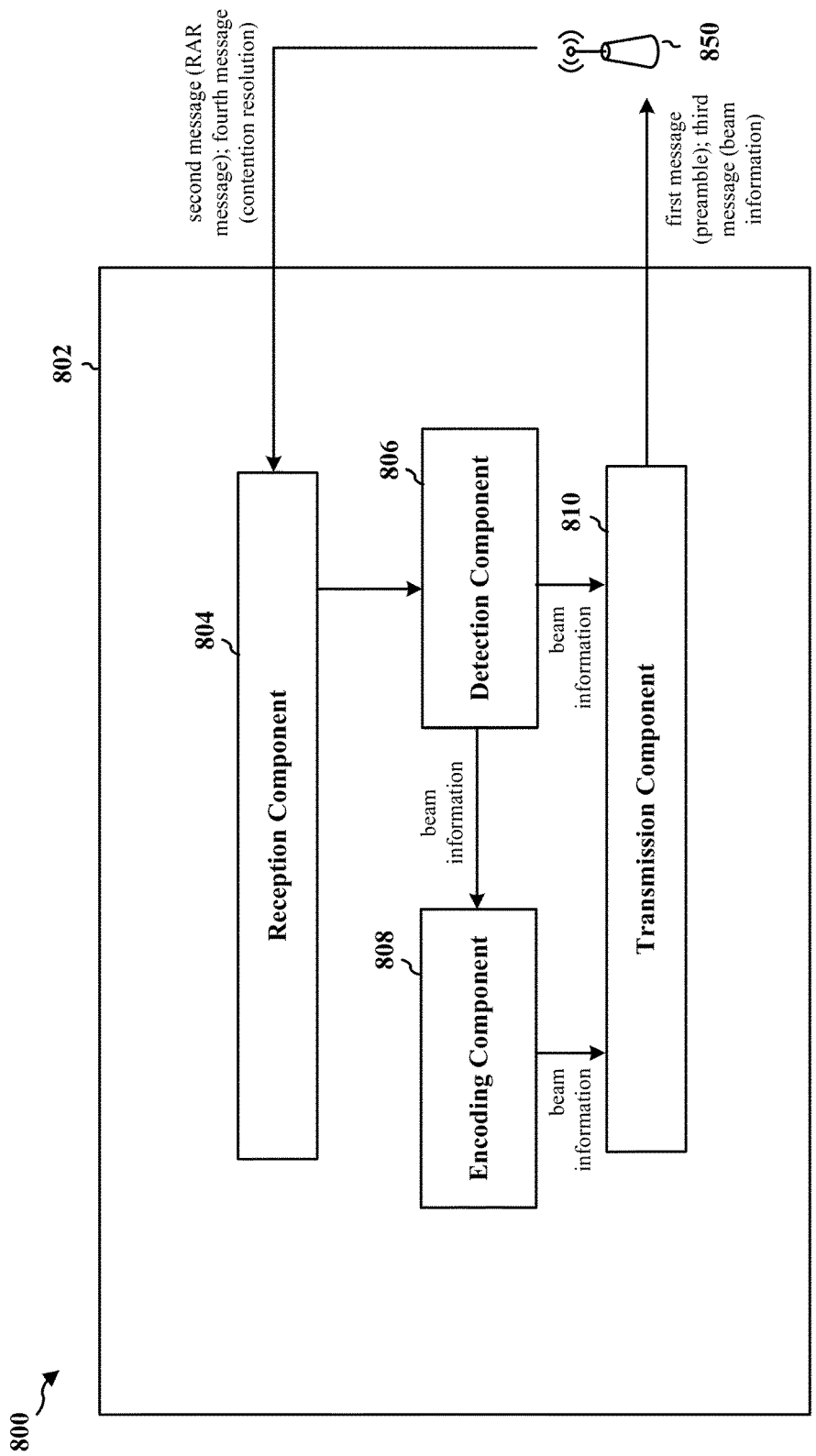
FIG. 8 is a conceptual data flow diagram illustrating the data flow between different means/components in an exemplary apparatus.

FIG. 8 is a conceptual data flow diagram 800 illustrating the data flow between different means/components in an exemplary apparatus 802. The apparatus may be a UE. The apparatus includes a reception component 804, a detection component 806, an encoding component 808, and a transmission component 810. The reception component 804 may be configured to receive a beam-formed message from a base station 850 during a RACH procedure. The detection component 806 may be configured to determine beam information based on the received beam-formed message during the RACH procedure. The transmission component 810 may be configured to transmit a message to the base station 850 during the RACH procedure that includes the determined beam information. In one aspect, the beam information may include an index identifying a strongest received beam at the apparatus or a signal strength of the strongest received beam at the apparatus. In another aspect, the determined beam information may be included in a MAC-CE of the message. In another aspect, the determined beam information may be included in a payload of the message. In one configuration, the encoding component 808 may be configured to multiplex the determined beam information as UCI with a payload of the message for transmission during the RACH procedure. The encoding component 808 may be configured to multiplex by determining an offset value for multiplexing the determined beam information with the payload, in which the offset value indicates a ratio of UCI modulation symbols to payload modulation symbols to be transmitted in the message, and to multiplex the determined beam information based on the determined offset value. In an aspect, the offset value may be a default value, based on physical broadcast channel parameters, or received from a network. In another aspect, the offset value may be received from the base station 850 in a RACH response message based on a PRACH transmission by the UE.

The apparatus may include additional components that perform each of the blocks of the algorithm in the aforementioned flowcharts of FIG. 7. As such, each block in the aforementioned flowcharts of FIG. 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 9:
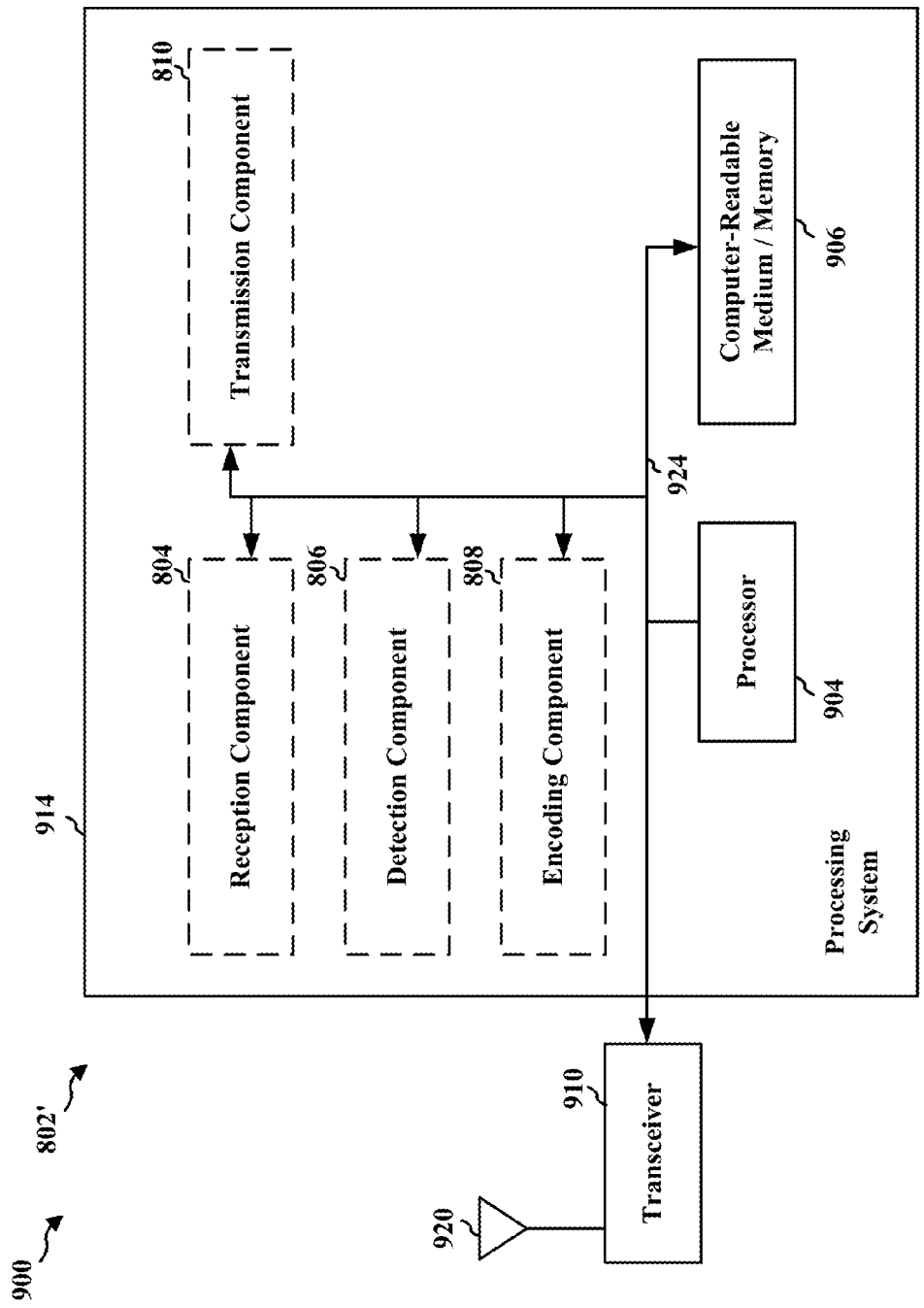
FIG. 9 is a diagram illustrating an example of a hardware implementation for an apparatus employing a processing system.

FIG. 9 is a diagram 900 illustrating an example of a hardware implementation for an apparatus 802' employing a processing system 914. The processing system 914 may be implemented with a bus architecture, represented generally by the bus 924. The bus 924 may include any number of interconnecting buses and bridges depending on the specific application of the processing system 914 and the overall design constraints. The bus 924 links together various circuits including one or more processors and/or hardware components, represented by the processor 904, the components 804, 806, 808, and the computer-readable medium/memory 906. The bus 924 may also link various other circuits such as timing sources, peripherals, voltage regulators, and power management circuits, which are well known in the art, and therefore, will not be described any further.

The processing system 914 may be coupled to a transceiver 910. The transceiver 910 is coupled to one or more antennas 920. The transceiver 910 provides a means for communicating with various other apparatus over a transmission medium. The transceiver 910 receives a signal from the one or more antennas 920, extracts information from the received signal, and provides the extracted information to the processing system 914, specifically the reception component 804. In addition, the transceiver 910 receives information from the processing system 914, specifically the transmission component 810, and based on the received information, generates a signal to be applied to the one or more antennas 920. The processing system 914 includes a processor 904 coupled to a computer-readable medium/memory 906. The processor 904 is responsible for general processing, including the execution of software stored on the computer-readable medium/memory 906. The software, when executed by the processor 904, causes the processing system 914 to perform the various functions described supra for any particular apparatus. The computer-readable medium/memory 906 may also be used for storing data that is manipulated by the processor 904 when executing software. The processing system 914 further includes at least one of the components 804, 806, 808. The components may be software components running in the processor 904, resident/stored in the computer readable medium/memory 906, one or more hardware components coupled to the processor 904, or some combination thereof. The processing system 914 may be a component of the UE 350 and may include the memory 360 and/or at least one of the TX processor 368, the RX processor 356, and the controller/processor 359.

In one configuration, the apparatus 802/802' for wireless communication includes means for receiving a beam-formed message from a base station during a RACH procedure. The apparatus may include means for determining beam information based on the received beam-formed message during the RACH procedure. The apparatus may include means for transmitting a message to the base station during the RACH procedure that includes the determined beam information. In one aspect, the beam information may include an index identifying a strongest received beam at the apparatus or a signal strength of the strongest received beam at the apparatus. In another aspect, the determined beam information is included in a MAC-CE of the message. In another aspect, the determined beam information may be included in a payload of the message. In one configuration, the apparatus may include means for multiplexing the determined beam information as UCI with a payload of the message for transmission during the RACH procedure. In an aspect, the means for multiplexing may be configured to determine an offset value for multiplexing the determined beam information with the payload, in which the offset value indicates a ratio of UCI modulation symbols to payload modulation symbols to be transmitted in the message, and to multiplex the determined beam information based on the determined offset value. In an aspect, the offset value may be a default value, based on physical broadcast channel parameters, or received from a network. In another aspect, the offset value may be received from the base station in a RACH response message based on a PRACH transmission by the UE. The aforementioned means may be one or more of the aforementioned components of the apparatus 802 and/or the processing system 914 of the apparatus 802' configured to perform the functions recited by the aforementioned means. As described supra, the processing system 914 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

The teachings, methods, techniques, and principles described herein are not limited to mmW networks and communications but are also applicable to other communication networks that utilize beamforming.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication by a user equipment (UE), comprising:
   receiving a message from a base station during a random access channel (RACH) procedure;
   determining beam information based on the received message during the RACH procedure; and
   transmitting a second message to the base station during the RACH procedure that includes the determined beam information, wherein the message, received during the RACH procedure, comprises a value indicating a request for beam information during the RACH procedure, and wherein the second message is transmitted based on the request for beam information.

2. The method of claim 1, wherein the received message is beam-formed and the beam information comprises an index identifying a strongest received beam at the UE or a signal strength of the strongest received beam at the UE on which the beam-formed message was received.

3. The method of claim 1, wherein the determined beam information is included in a medium access control (MAC) control element (CE) (MAC-CE) of the second message.

4. The method of claim 1, wherein the determined beam information is included in a payload of the second message.

5. The method of claim 1, further comprising multiplexing the determined beam information as uplink control information (UCI) with a payload of the second message for transmission during the RACH procedure.

6. The method of claim 5, wherein the multiplexing comprises:
   determining an offset value for multiplexing the determined beam information with the payload, the offset value indicating a ratio of UCI modulation symbols to payload modulation symbols to be transmitted in the second message; and
   multiplexing the determined beam information based on the determined offset value.

7. The method of claim 6, wherein the offset value is a default value, based on physical broadcast channel parameters, or received from a network.

8. The method of claim 7, wherein the offset value is received from the base station in a RACH response message based on a physical RACH (PRACH) transmission by the UE.

9. The method of claim 1, wherein the message is a random access response (RAR) message indicating a resource on a physical uplink shared channel (PUSCH) for transmitting the beam information, and wherein the beam information is transmitted on the resource indicated in the RAR message.

10. An apparatus for wireless communication, comprising:
    means for receiving a message from a base station during a random access channel (RACH) procedure;

means for determining beam information based on the received message during the RACH procedure; and means for transmitting a second message to the base station during the RACH procedure that includes the determined beam information, wherein the message, received during the RACH procedure, comprises a value indicating a request for beam information during the RACH procedure, and wherein the second message is transmitted based on the request for beam information.

11. The apparatus of claim 10, wherein the received message is beam-formed and the beam information comprises an index identifying a strongest received beam at the apparatus or a signal strength of the strongest received beam at the apparatus.

12. The apparatus of claim 10, wherein the determined beam information is included in a medium access control (MAC) control element (CE) (MAC-CE) of the second message.

13. The apparatus of claim 10, wherein the determined beam information is included in a payload of the second message.

14. The apparatus of claim 10, further comprising means for multiplexing the determined beam information as uplink control information (UCI) with a payload of the second message for transmission during the RACH procedure.

15. The apparatus of claim 14, wherein the means for multiplexing is configured to:
determine an offset value for multiplexing the determined beam information with the payload, the offset value indicating a ratio of UCI modulation symbols to payload modulation symbols to be transmitted in the second message; and
multiplex the determined beam information based on the determined offset value.

16. The apparatus of claim 15, wherein the offset value is a default value, based on physical broadcast channel parameters, or received from a network.

17. The apparatus of claim 16, wherein the offset value is received from the base station in a RACH response message based on a physical RACH (PRACH) transmission by the apparatus.

18. The apparatus of claim 10, wherein the message is a random access response (RAR) message indicating a resource on a physical uplink shared channel (PUSCH) for transmitting the beam information, and wherein the beam information is transmitted on the resource indicated in the RAR message.

19. An apparatus for wireless communication, comprising:
a memory; and
at least one processor coupled to the memory and configured to:
receive a message from a base station during a random access channel (RACH) procedure;
determine beam information based on the received message during the RACH procedure; and
transmit a second message to the base station during the RACH procedure that includes the determined beam information, wherein the message, received during the RACH procedure, comprises a value indicating a request for beam information during the RACH procedure, and wherein the second message is transmitted based on the request for beam information.

20. The apparatus of claim 19, wherein the received message is beam-formed and the beam information comprises an index identifying a strongest received beam at the UE or a signal strength of the strongest received beam at the UE.

21. The apparatus of claim 19, wherein the determined beam information is included in a medium access control (MAC) control element (CE) (MAC-CE) of the second message.

22. The apparatus of claim 19, wherein the determined beam information is included in a payload of the second message.

23. The apparatus of claim 19, wherein the at least one processor is further configured to multiplex the determined beam information as uplink control information (UCI) with a payload of the second message for transmission during the RACH procedure.

24. The apparatus of claim 23, wherein the at least one processor is configured to multiplex by:
determining an offset value for multiplexing the determined beam information with the payload, the offset value indicating a ratio of UCI modulation symbols to payload modulation symbols to be transmitted in the second message; and
multiplexing the determined beam information based on the determined offset value.

25. The apparatus of claim 24, wherein the offset value is a default value, based on physical broadcast channel parameters, or received from a network.

26. The apparatus of claim 25, wherein the offset value is received from the base station in a RACH response message based on a physical RACH (PRACH) transmission by the apparatus.

27. The apparatus of claim 19, wherein the message is a random access response (RAR) message indicating a resource on a physical uplink shared channel (PUSCH) for transmitting the beam information, and wherein the beam information is transmitted on the resource indicated in the RAR message.

28. A computer-readable medium of a user equipment (UE) storing computer executable code, comprising code to:
receive a message from a base station during a random access channel (RACH) procedure;
determine beam information based on the received message during the RACH procedure; and
transmit a second message to the base station during the RACH procedure that includes the determined beam information, wherein the message, received during the RACH procedure, comprises a value indicating a request for beam information during the RACH procedure, and wherein the second message is transmitted based on the request for beam information.

29. A method of wireless communication by a user equipment (UE), comprising:
receiving an uplink resource grant including an offset value from a base station;
determining, based on the offset value, resource elements of a resource block for transmitting uplink control information (UCI) in an uplink data channel, wherein the offset value indicates a ratio of the resource elements of the resource block for transmitting the UCI to resource elements of the resource block for transmitting a data payload of an uplink message in the uplink data channel; and
transmitting the UCI in the uplink data channel on the resource elements.

30. The method of claim 29, further comprising:
multiplexing the UCI with the data payload of the uplink message based on the offset value for transmission in the uplink data channel.

31. The method of claim 29, wherein the UCI includes at least one of channel quality indicator (CQI), a precoding matrix indicator (PMI), a rank indicator (RI), an acknowledgment (ACK) feedback, a negative ACK (HACK) feedback, or beam information associated with a downlink beam.

32. The method of claim 31, wherein the beam information includes an index identifying a strongest received beam at the UE or a signal strength of the strongest received beam at the UE on which a downlink message was received in a beam-formed manner.

33. The method of claim 32, wherein the uplink resource grant is received in the downlink message.

34. The method of claim 32, wherein the downlink message is a RACH response message received in response to a physical RACH (PRACH) transmission by the UE.

35. The method of claim 34, wherein the UCI is transmitted in response to the RACH response message.

36. The method of claim 29, wherein the uplink resource grant is a physical uplink shared channel (PUSCH) resource grant, the uplink data channel being the PUSCH.

* * * * *

UNITED STATES PATENT AND TRADEMARK OFFICE
CERTIFICATE OF CORRECTION

| | | |
|---|---|---|
| PATENT NO. | : 10,396,881 B2 | Page 1 of 1 |
| APPLICATION NO. | : 15/433738 | |
| DATED | : August 27, 2019 | |
| INVENTOR(S) | : Sony Akkarakaran et al. | |

It is certified that error appears in the above-identified patent and that said Letters Patent is hereby corrected as shown below:

In the Claims

Claim 31, Column 21, Line 4, the word "(HACK)" should be replaced with --(NACK)--.

Signed and Sealed this
Twenty-seventh Day of April, 2021

Drew Hirshfeld
*Performing the Functions and Duties of the*
*Under Secretary of Commerce for Intellectual Property and*
*Director of the United States Patent and Trademark Office*